United States Patent
Imai et al.

(10) Patent No.: US 10,144,409 B2
(45) Date of Patent: Dec. 4, 2018

(54) ENGINE CONTROL DEVICE OF WORK MACHINE, WORK MACHINE, AND ENGINE CONTROL METHOD OF WORK MACHINE

(71) Applicant: Komatsu Ltd., Tokyo (JP)

(72) Inventors: Tomotaka Imai, Hiratsuka (JP); Tsubasa Ohira, Hiratsuka (JP); Masaru Shizume, Yokohama (JP)

(73) Assignee: Komatsu Ltd., Tokyo (JP)

( * ) Notice: Subject to any disclaimer, the term of this patent is extended or adjusted under 35 U.S.C. 154(b) by 39 days.

(21) Appl. No.: 15/118,997

(22) PCT Filed: Jan. 20, 2016

(86) PCT No.: PCT/JP2016/051629
§ 371 (c)(1),
(2) Date: Aug. 15, 2016

(87) PCT Pub. No.: WO2016/108293
PCT Pub. Date: Jul. 7, 2016

(65) Prior Publication Data
US 2017/0203749 A1  Jul. 20, 2017

(51) Int. Cl.
*B60W 20/10* (2016.01)
*B60W 10/06* (2006.01)
(Continued)

(52) U.S. Cl.
CPC ............ *B60W 20/10* (2013.01); *B60W 10/06* (2013.01); *B60W 10/30* (2013.01); *E02F 9/2296* (2013.01);
(Continued)

(58) Field of Classification Search
CPC ...... B60W 20/10; B60W 10/06; B60W 10/30; B60W 2300/17; B60W 2710/305;
(Continued)

(56) References Cited

U.S. PATENT DOCUMENTS 5,505,267 A * 4/1996 Orbach .................. B60K 23/04
172/3
2012/0185141 A1* 7/2012 Kamado ............... E02F 9/2066
701/50
(Continued)

FOREIGN PATENT DOCUMENTS

CN 102483056 A 5/2012
CN 104314131 A 1/2015
(Continued)

OTHER PUBLICATIONS

International Search Report dated Mar. 22, 2016, issued for PCT/JP2016/051629.
(Continued)

*Primary Examiner* — Nga X Nguyen
(74) *Attorney, Agent, or Firm* — Locke Lord LLP

(57) ABSTRACT

An engine control device of a work machine controls an internal-combustion engine of the work machine including a swing body, an implement attached to the swing body, a hydraulic actuator that operates the implement, a hydraulic pump that operates the hydraulic actuator, and the internal-combustion engine that drives the hydraulic pump and of which a rotation speed is changed according to a load. The engine control device of the work machine includes: a determination unit configured to determine whether a condition not requiring work with the implement is established; and an engine control unit configured to enable control at relief time of determining a target rotation speed targeted by the internal-combustion engine based on horsepower sucked by the hydraulic pump of when a hydraulic oil ejected by the hydraulic pump is relieved when the condition is established, and disables the control at relief time when the condition is not established.

6 Claims, 6 Drawing Sheets

(51) Int. Cl.
  *B60W 10/30* (2006.01)
  *E02F 9/22* (2006.01)
  *F15B 11/08* (2006.01)
  *F02D 29/04* (2006.01)

(52) U.S. Cl.
  CPC .............. *F02D 29/04* (2013.01); *F15B 11/08* (2013.01); *B60W 2300/17* (2013.01); *B60W 2510/305* (2013.01); *B60W 2710/0677* (2013.01); *B60W 2710/305* (2013.01); *F15B 2211/205* (2013.01); *F15B 2211/20523* (2013.01); *F15B 2211/275* (2013.01)

(58) Field of Classification Search
  CPC ..... B60W 2710/0677; B60W 2510/305; E02F 9/2296; F15B 11/08; F15B 2211/205; F15B 2211/20523; F15B 2211/275; F02D 29/04
  USPC .............................................. 701/50, 54, 70
  See application file for complete search history.

(56) References Cited

U.S. PATENT DOCUMENTS

| | | |
|---|---|---|
| 2014/0054902 A1 | 2/2014 | Kawaguchi et al. |
| 2014/0188373 A1 | 7/2014 | Kawaguchi et al. |
| 2014/0200795 A1* | 7/2014 | Kawaguchi ........... F02D 31/008 701/110 |
| 2014/0230785 A1 | 8/2014 | Kawaguchi et al. |
| 2015/0176610 A1 | 6/2015 | Akiyama et al. |
| 2016/0146232 A1 | 5/2016 | Ooki et al. |

FOREIGN PATENT DOCUMENTS

| | | |
|---|---|---|
| CN | 104372823 A | 2/2015 |
| CN | 104395613 A | 3/2015 |
| CN | 105008729 A | 10/2015 |
| DE | 112011100048 B4 | 6/2012 |
| DE | 112012000060 T5 | 4/2013 |
| DE | 112012000351 T5 | 11/2014 |
| EP | 2626475 A1 | 8/2013 |
| JP | 2012-241585 A | 12/2012 |
| JP | 2012-241586 A | 12/2012 |
| JP | 2012-241587 A | 12/2012 |
| JP | 2014-101820 A | 6/2014 |

OTHER PUBLICATIONS

Office Action dated Mar. 30, 2017, issued for the corresponding Chinese patent application No. 20168000190.4.

Office Action dated Aug. 22, 2018 issued for corresponding German Patent Application No. 11 2016 000 010.3.

* cited by examiner

ENGINE CONTROL DEVICE OF WORK MACHINE, WORK MACHINE, AND ENGINE CONTROL METHOD OF WORK MACHINE

FIELD

The present invention relates to a technology for controlling an engine included in a work machine and serving as a power source.

BACKGROUND

Work machines include an internal-combustion engine as a power source that generates power for traveling or power for operating an implement, for example. In recent years, for example, as described in Patent Literature 1, there is a work machine in which the internal-combustion engine and a generator motor are combined, and which uses the power generated by the internal-combustion engine as the power of the work machine, and drives the generator motor by the internal-combustion engine to generate electric power.

CITATION LIST

Patent Literature

Patent Literature 1: Japanese Unexamined Patent Application Publication No. 2012-241585

SUMMARY

Technical Problem

A work machine including a swing body, of the work machines, may have an increase in a rotation speed of the internal-combustion engine when relief of a hydraulic oil occurs, which is not intended by an operator, during swing of the swing body. For example, in a work machine in which the rotation speed of the internal-combustion engine is changed according to a load, the rotation speed of the internal-combustion engine may be increased due to load change when the relief of the hydraulic oil occurs during an operation where the relief of the hydraulic oil is not intended. When the increase in the rotation speed cannot be permitted by the operator of the work machine, the operator may have uncomfortable feeling.

A form of the present invention intends to suppress an increase in a rotation speed of an internal-combustion engine when an operation associated with swing of a swing body is performed in a work machine including the swing body.

Solution to Problem

According to a first aspect of the present invention, an engine control device of a work machine, the control device controlling an internal-combustion engine of the work machine including a swing body, an implement attached to the swing body, a hydraulic actuator that operates the implement, a hydraulic pump that operates the hydraulic actuator, and the internal-combustion engine that drives the hydraulic pump and of which a rotation speed is changed according to a load, comprises: a determination unit configured to determine whether a condition not requiring work with the implement is established; and an engine control unit configured to enable control at relief time of determining a target rotation speed targeted by the internal-combustion engine based on horsepower sucked by the hydraulic pump of when a hydraulic oil ejected by the hydraulic pump is relieved when the condition is established, and disables the control at relief time when the condition is not established.

According to a second aspect of the present invention, in the engine control device of a work machine according to the first aspect, the condition is either one of a time of diagnosis that is a case of diagnosing at least the work machine and a time of swing lock that is a case of fixing swing of the swing body included in the work machine.

According to a third aspect of the present invention, in the engine control device of a work machine according to the first or second aspect, the hydraulic actuator is a hydraulic cylinder.

According to a third aspect of the present invention, in the engine control device of a work machine according to any one of the first to third aspects, the work machine includes a generator motor driven by the internal-combustion engine, and a storage device that stores electric power generated by the generator motor, and supplies the stored electric power to the generator motor.

According to a third aspect of the present invention, a work machine comprises the engine control device of a work machine any one of the first to fourth aspects.

According to a sixth aspect of the present invention, an engine control method of a work machine, in controlling an internal-combustion engine of the work machine including a swing body, an implement attached to the swing body, a hydraulic actuator that operates the implement, a hydraulic pump that operates the hydraulic actuator, and the internal-combustion engine that drives the hydraulic pump and of which a rotation speed is changed according to a load, the method comprises: determining whether a condition not requiring work with the implement is established; and enabling control at relief time of determining a target rotation speed targeted by the internal-combustion engine based on horsepower sucked by the hydraulic pump of when a hydraulic oil ejected by the hydraulic pump is relieved when the condition is established, and disabling the control at relief time when the condition is not established.

A form of the present invention can suppress suppression of an increase in a rotation speed of an internal-combustion engine when an operation associated with swing of a swing body is performed in a work machine including the swing body.

DESCRIPTION OF EMBODIMENTS

Forms for implementing the present invention (embodiments) will be described in detail with reference to the drawings.

<Overall Configuration of Work Machine>

Figure 1:
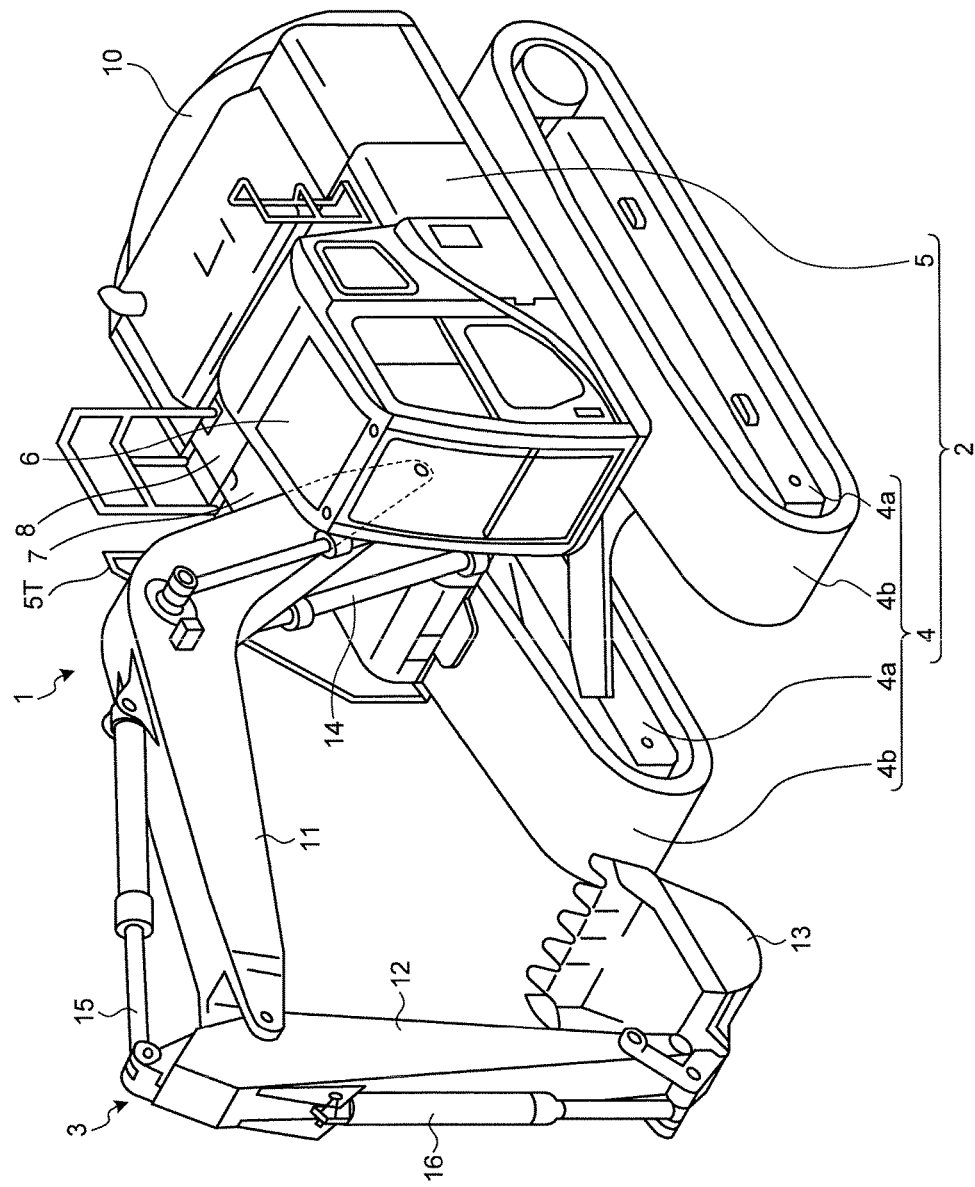
FIG. 1 is a perspective view illustrating an excavator that is a work machine according to an embodiment.

FIG. 1 is a perspective view illustrating an excavator 1 that is a work machine according to an embodiment. The excavator 1 includes a vehicle main body 2 and an implement 3. The vehicle main body 2 includes a lower travel body 4 and an upper swing body 5. The lower travel body 4 includes a pair of travel devices 4a, 4a. The travel devices 4a, 4a respectively include crawlers 4b and 4b. The travel devices 4a, 4a respectively include travel motors 21. The travel motor 21 illustrated in FIG. 1 drives the left-side crawler 4b. Although not illustrated in FIG. 1, the excavator 1 also includes a travel motor that drives the right-side crawler 4b. The travel motor that drives the left-side crawler 4b is referred to as left travel motor, and the travel motor that travels the right-side crawler 4b is referred to as right travel motor. The right travel motor and the left travel motor respectively drive the crawlers 4b and 4b to cause the excavator 1 to travel or swing.

The upper swing body 5 that is an example of a swing body is swingably provided on the lower travel body 4. The excavator 1 swings by a swing motor for causing the upper swing body 5 to swing. The swing motor may be an electric motor that converts the electric power into rotational force, may be a hydraulic motor that converts pressure of a hydraulic oil into rotational force, or may be a combination of the hydraulic motor and the electric motor. In an embodiment, the swing motor is an electric motor.

The upper swing body 5 includes an operator's cab 6. Further, the upper swing body 5 includes a fuel tank 7, a hydraulic oil tank 8, an engine room 9, and a counter weight 10. The fuel tank 7 stores fuel for driving an engine. The hydraulic oil tank 8 stores hydraulic oil ejected by a hydraulic pump to hydraulic cylinders of a boom cylinder 14, an arm cylinder 15, and a bucket cylinder 16, and hydraulic actuators of the travel motors 21, and the like. The engine room 9 houses an engine serving as a power source of the excavator and devices such as a hydraulic pump that supplies a hydraulic oil to hydraulic devices. The counter weight 10 is arranged posterior to the engine room 9. A rail 5T is attached to an upper portion of the upper swing body 5.

The implement 3 is attached to a front central position of the upper swing body 5. The implement 3 includes a boom 11, an arm 12, a bucket 13, the boom cylinder 14, the arm cylinder 15, and the bucket cylinder 16. A base end portion of the boom 11 is connected to the upper swing body 5 with pins. With such a structure, the boom 11 is operated with respect to the upper swing body 5.

The boom 11 is connected with the arm 12 with pins. To be specific, a tip end portion of the boom 11 and a base end portion of the arm 12 are connected with pins. A tip end portion of the arm 12 and the bucket 13 are connected with pins. With such a structure, the arm 12 is operated with respect to the boom 11. Further, the bucket 13 is operated with respect to the arm 12.

The boom cylinder 14, the arm cylinder 15, and the bucket cylinder 16 are hydraulic cylinders driven with the hydraulic oil ejected by the hydraulic pump. The boom cylinder 14 operates the boom 11. The arm cylinder 15 operates the arm 12. The bucket cylinder 16 operates the bucket 13. As described above, the boom cylinder 14, the arm cylinder 15, and the bucket cylinder 16 as hydraulic actuators operate the implement 3.

<Drive System 1PS of Excavator 1>

Figure 2:
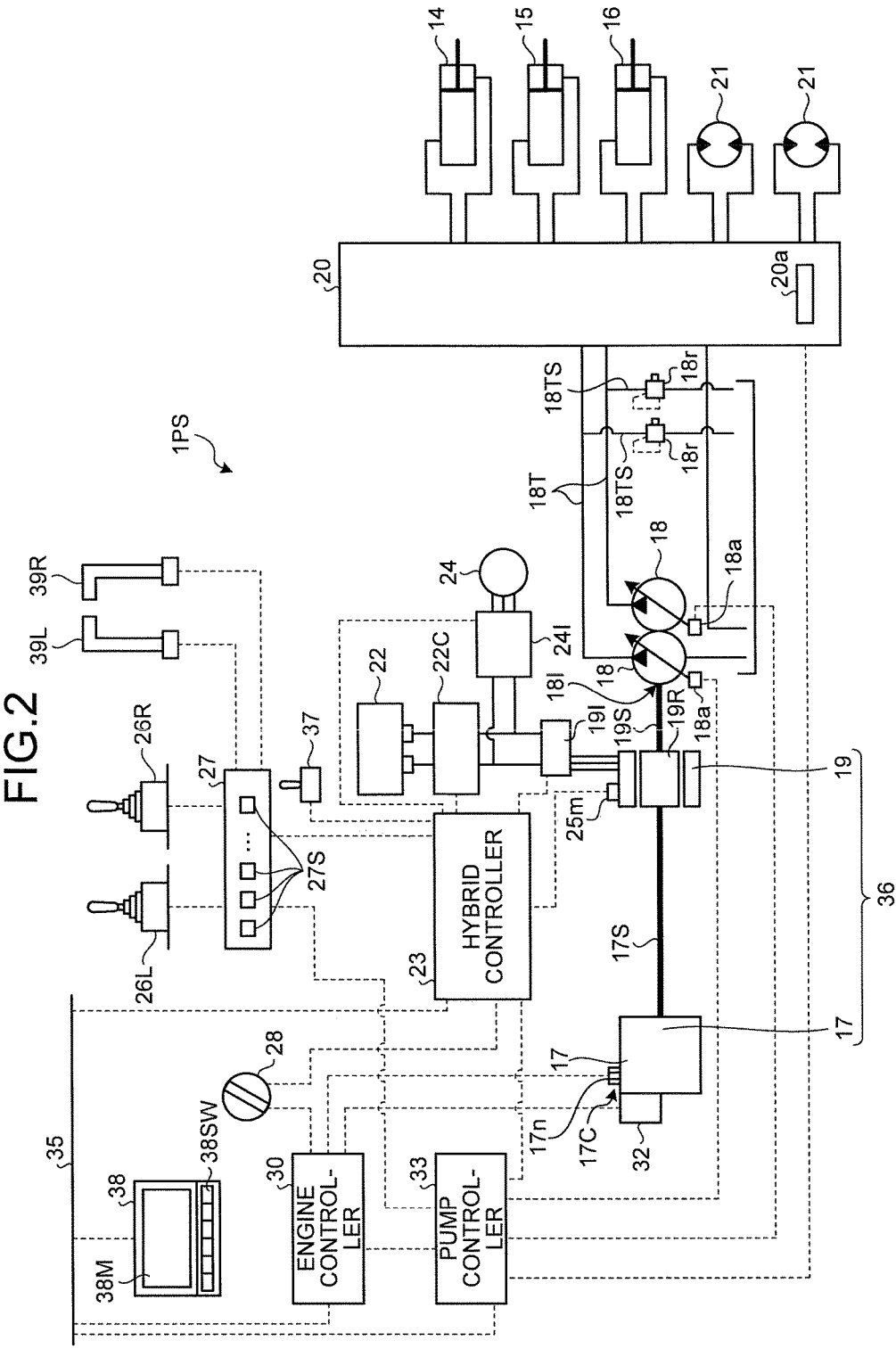
FIG. 2 is a schematic view illustrating a drive system of an excavator according to an embodiment.

FIG. 2 is a schematic view illustrating a drive system of the excavator 1 according to an embodiment. In an embodiment, the excavator 1 is a hybrid work machine in which an internal-combustion engine 17, a generator motor 19 that is driven by the internal-combustion engine 17 and generates electricity, a storage device 22 that stores electric power, an a motor driven by being supplied the electric power generated by the generator motor 19 or the electric power discharged from the storage device 22 are combined. To be specific, the excavator 1 causes the upper swing body 5 to swing by a motor 24 (hereinafter, appropriately referred to as swing motor 24). In an embodiment, the excavator 1 may be a work machine without including the generator motor 19, for example, other than the hybrid work machine.

The excavator 1 includes the internal-combustion engine 17, a hydraulic pump 18, the generator motor 19, and the swing motor 24. The internal-combustion engine 17 is a power source of the excavator 1. In an embodiment, the internal-combustion engine 17 is a diesel engine. The generator motor 19 is connected to an output shaft 17S of the internal-combustion engine 17. With such a structure, the generator motor 19 is driven by the internal-combustion engine 17 and generates the electric power. Further, the generator motor 19 is driven by the electric power supplied from the storage device 22 when the power generated by the internal-combustion engine 17 becomes insufficient, and supports the internal-combustion engine 17.

In an embodiment, the internal-combustion engine 17 is, but not limited to, a diesel engine. The generator motor 19 is, but not limited to, a switched reluctance (SR) motor. In an embodiment, the generator motor 19 has a rotor 19R directly connected to the output shaft 17S of the internal-combustion engine 17. However, a structure is not limited to the structure. For example, the generator motor 19 may have the rotor 19R connected with the output shaft 17S of the internal-combustion engine 17 through power take off (PTO). The rotor 19R of the generator motor 19 may be connected to transmission means such as a reduction gear connected to the output shaft 17S of the internal-combustion engine 17, and driven by the internal-combustion engine 17. In an embodiment, the combination of the internal-combustion engine 17 and the generator motor 19 serves as the power source of the excavator 1. The combination of the internal-combustion engine 17 and the generator motor 19 is appropriately referred to as engine 36. The engine 36 is a hybrid-system engine in which the internal-combustion engine 17 and the generator motor 19 are combined, and which generates power required by the excavator 1 as the work machine.

The hydraulic pump 18 supplies the hydraulic oil to the hydraulic actuator and operates the hydraulic actuator. In the present embodiment, as the hydraulic pump 18, for example, a variable displacement hydraulic pump like a swash plate-type hydraulic pump is used. An input output 18I of the hydraulic pump 18 is connected to a power transmission shaft 19S connected to the rotor of the generator motor 19. With such a structure, the hydraulic pump 18 is driven by the internal-combustion engine 17.

From first piping 18T connected to an ejection port through which the hydraulic pump 18 ejects the hydraulic oil, second piping 18TS that guides the hydraulic oil to a relief valve 18r is branched. The relief valve 18r is attached to the second piping 18TS. The relief valve 18r is opened when the pressure becomes a predetermined pressure, and discharges the hydraulic oil. The relief valve 18r suppresses an excessive increase in the hydraulic pressure that a drive system 1PS of the excavator 1 has. In an embodiment, the hydraulic system includes the hydraulic pump 18, the boom cylinder 14, the arm cylinder 15, the bucket cylinder 16, the travel motor 21, and a control valve 20.

The drive system 1PS includes the storage device 22 and a swing motor control device 24I as an electric drive system for driving the swing motor 24. In an embodiment, the storage device 22 is a capacitor, to be specific, an electric double layer capacitor. However, the storage device 22 is not limited thereto, and is, for example, a secondary battery such as a nickel hydrogen battery, a lithium ion battery, or a lead storage battery. The swing motor control device 24I is an inverter, for example.

The electric power generated by the generator motor 19 or the electric power discharged from the storage device 22 is supplied to the swing motor 24 through an electric power cable, and causes the upper swing body 5 illustrated in FIG. 1 to swing. That is, the swing motor 24 performs a power-run operation by the electric power supplied (generated) from the generator motor 19 or the electric power supplied (discharged) from the storage device 22 to cause the upper swing body 5 to swing. The swing motor 24 performs a regenerative operation when the upper swing body 5 decelerates, thereby to supply (charge) the electric power to the storage device 22. Further, the generator motor 19 supplies (charges) the electric power generated by itself to the storage device 22. That is, the storage device 22 can store the electric power generated by the generator motor 19.

The generator motor 19 is driven by the internal-combustion engine 17 to generate the electric power, or driven by the electric power supplied from the storage device 22 to drive the internal-combustion engine 17. A hybrid controller 23 controls the generator motor 19 through a generator motor control device 19I. That is, the hybrid controller 23 generates a control signal for driving the generator motor 19 and provides the control signal to the generator motor control device 19I. The generator motor control device 19I causes the generator motor 19 to generate the electric power based on the control signal (regeneration), or causes the generator motor 19 to generate power (power-running). The generator motor control device 19I is an inverter, for example.

A rotation sensor 25m is provided in the generator motor 19. The rotation sensor 25m detects a rotation speed of the generator motor 19, that is, an engine speed per unit time of the rotor 19R. The rotation sensor 25m converts the detected rotation speed into an electrical signal, and outputs the electrical signal to the hybrid controller 23. The hybrid controller 23 acquires the rotation speed of the generator motor 19 detected by the rotation sensor 25m, and uses the rotation speed for control of operation states of the generator motor 19 and the internal-combustion engine 17. As the rotation sensor 25m, a resolver or a rotary encoder is used, for example. In an embodiment, the rotation speed of the generator motor 19 and the rotation speed of the internal-combustion engine 17 are the same rotation speed. In an embodiment, the rotation sensor 25m may detect an engine speed of the rotor 19R of the generator motor 19, and the hybrid controller 23 may convert the engine speed into the rotation speed. In an embodiment, the rotation speed of the generator motor 19 can be substituted with a value detected by a rotation speed detection sensor 17n of the internal-combustion engine 17.

The rotation sensor 25m is provided to the swing motor 24. The rotation sensor 25m detects the rotation speed of the swing motor 24. The rotation sensor 25m converts the detected rotation speed into an electrical signal, and outputs the electrical signal to the hybrid controller 23. As the swing motor 24, for example, an embedded magnet synchronous motor is used. As the rotation sensor 25m, a resolver or a rotary encoder is used, for example.

The hybrid controller 23 acquires signals of detection values of temperature sensors such as thermistors or thermocouples provided in the generator motor 19, the swing motor 24, the storage device 22, the swing motor control device 24I, and the generator motor control device 19I described below. The hybrid controller 23 manages temperatures of the devices such as the storage device 22 based on the acquired temperatures, and executes charge/discharge control of the storage device 22, power generation control of the generator motor 19/auxiliary control of the internal-combustion engine 17, and power-run control/regenerative control of the swing motor 24. Further, the hybrid controller 23 executes an engine control method according to an embodiment.

The storage device 22 is connected with a transformer 22C. The transformer 22C is connected with the generator motor control device 19I and the swing motor control device 24I. The transformer 22C transfers direct-current electric power to/from the generator motor control device 19I and the swing motor control device 24I. The hybrid controller 23 transfers the direct-current electric power between the transformer 22C, and the generator motor control device 19I and the swing motor control device 24I, and transfers the direct-current electric power between the transformer 22C and the storage device 22.

The drive system 12S includes operation levers 26R, 26L and travel levers 39L, 39R provided on right and left positions with respect to an operator sitting position in the operator's cab 6 provided on the vehicle main body 2 illustrated in FIG. 1. The operation levers 26R, 26L are devices for performing an operation of the implement 3 and an operation of travel of the excavator 1. The operation levers 26R, 26L operate the implement 3 and the upper swing body 5 according to the respective operations. The travel levers 39L, 39R drive at least one of the pair of travel motors 21 and 21 included in the travel devices 4a, 4a according to the respective operations.

A pilot hydraulic pressure is generated based on operation amounts of the operation levers 26R, 26L and the travel levers 39L, 39R. The pilot hydraulic pressure is supplied to a control valve described below. The control valve drives a spool of the implement 3 according to the pilot hydraulic pressure. The hydraulic oil is supplied to the boom cylinder 14, the arm cylinder 15, and the bucket cylinder 16 in accordance with movement of the spool. As a result, for example, up/down operations of the boom 11 are performed according to front/rear operations of the operation lever 26R, and excavation/dump of the bucket 13 are performed according to right/left operations of the operation lever 26R. Further, for example, the dump/excavation operations of the arm 12 are performed by front/rear operations of the operation lever 26L. The crawler of the left-side travel device 4a is rotated in a frontward direction and a rearward direction by front/rear operations of the travel lever 39L, and the crawler of the right-side travel device 4a is rotated in the frontward direction and the rearward direction by front/rear operations of the travel lever 39R.

Further, the operation amounts of the operation levers 26R, 26L and the travel levers 39L, 39R are converted into electrical signals by a lever operation amount detection unit 27. The lever operation amount detection unit 27 includes a pressure sensor 27S. The pressure sensor 27S detects the pilot hydraulic pressures generated according to the operations of the operation levers 26L, 26R. The pressure sensor 27S outputs voltages corresponding to the detected pilot hydraulic pressures. The lever operation amount detection unit 27 obtains lever operation amounts by converting the voltages output by the pressure sensor 27S into the operation amounts.

The lever operation amount detection unit 27 outputs the lever operation amount to at least one of a pump controller 33 and the hybrid controller 23 as the electrical signal. In a case where the operation levers 26L, 26R and the travel levers 39L, 39R are electric levers, the lever operation amount detection unit 27 includes an electric detection device such as a potentiometer. The lever operation amount detection unit 27 converts a voltage generated by the electric detection device according to the lever operation amount into the lever operation amount and obtains the lever operation amount. As a result, for example, the swing motor 24 is driven in right and left swing directions by the right/left operations of the operation lever 26L. Further, the travel motor 21 is driven by the travel levers 39L, 39R.

The fuel adjustment dial 28 is provided in the operator's cab 6 illustrated in FIG. 1. Hereinafter, the fuel adjustment dial 28 is appropriately referred to as throttle dial 28. The throttle dial 28 sets a fuel supply amount to the internal-combustion engine 17. A set value (also referred to as command value) of the throttle dial 28 is converted into an electrical signal and output to a control device (hereinafter, appropriately referred to as engine controller) 30 of the internal-combustion engine.

An engine controller 30 acquires the rotation speed of the internal-combustion engine 17 and output values of sensors of water temperature and the like from sensors 17C that detect the state of the internal-combustion engine 17. Then, the engine controller 30 grasps the state of the internal-combustion engine 17 from the acquired output values of the sensors 17C, and adjusts an ejection amount of the fuel to the internal-combustion engine 17, thereby to control an output of the internal-combustion engine 17. In an embodiment, the engine controller 30 includes a computer including a processor such as a CPU and a memory.

The engine controller 30 generates a control command signal for controlling the operation of the internal-combustion engine 17 based on the set value of the throttle dial 28. The engine controller 30 transmits the generated control signal to a common rail control unit 32. The common rail control unit 32 that has received the control signal adjusts the fuel injection amount for the internal-combustion engine 17. That is, in an embodiment, the internal-combustion engine 17 is an electronically controllable diesel engine in a common rail system. The engine controller 30 controls the fuel injection amount to the internal-combustion engine 17 through the common rail control unit 32, thereby to cause the internal-combustion engine 17 to generate a target output. Further, the engine controller 30 can freely set an outputtable torque in the rotation speed of the internal-combustion engine 17 at a certain moment. The hybrid controller 23 and the pump controller 33 receive the set value of the throttle dial 28 from the engine controller 30.

The internal-combustion engine 17 includes the rotation speed detection sensor 17n. The rotation speed detection sensor 17n detects the rotation speed of the output shaft 17S of the internal-combustion engine 17, that is, the engine speed per unit time of the output shaft 17S. The engine controller 30 and the pump controller 33 acquire the rotation speed of the internal-combustion engine 17 detected by the rotation speed detection sensor 17n, and use the rotation speed for control of the operation state of the internal-combustion engine 17. In an embodiment, the rotation speed detection sensor 17n detects the engine speed of the internal-combustion engine 17, and the engine controller 30 and the pump controller 33 may convert the engine speed into the rotation speed. In an embodiment, an actual rotation speed of the internal-combustion engine 17 can be substituted with the value detected by the rotation sensor 25m of the generator motor 19.

The pump controller 33 controls a flow rate of the hydraulic oil ejected by the hydraulic pump 18. In an embodiment, the pump controller 33 includes a computer including a processor such as a CPU and a memory. The pump controller 33 receives signals transmitted from the engine controller 30 and the lever operation amount detection unit 27. The pump controller 33 then generates a control command signal for adjusting the flow rate of the hydraulic oil ejected by the hydraulic pump 18. The pump controller 33 changes the flow rate of the hydraulic oil ejected by the hydraulic pump 18 by changing a swash plate angle of the hydraulic pump 18 using the generated control signal.

A signal from a swash plate angular sensor 18a that detects the swash plate angle of the hydraulic pump 18 is input to the pump controller 33. The swash plate angular sensor 18a detects the swash plate angle, so that the pump controller 33 can calculate a pump capacity of the hydraulic pump 18. In the control valve 20, a pump pressure detection unit 20a for detecting an ejection pressure (hereinafter, appropriately referred to as pump ejection pressure) of the hydraulic pump 18 is provided. The detected pump ejection pressure is converted into an electrical signal, and input to the pump controller 33.

The engine controller 30, the pump controller 33, and the hybrid controller 23 are connected by in-vehicle local area network (LAN) 35 like a controller area network (CAN). With such a structure, the engine controller 30, the pump controller 33, and the hybrid controller 23 can mutually exchange information.

In an embodiment, at least the engine controller 30 controls the operation state of the internal-combustion engine 17. In this case, the engine controller 30 controls the operation state of the internal-combustion engine 17 using the information generated by at least one of the pump controller 33 and the hybrid controller 23. As described above, in an embodiment, at least one of the engine controller 30, the pump controller 33, and the hybrid controller 23 functions as an engine control device of a work machine (hereinafter, appropriately referred to as engine control device). That is, at least one of them realizes an engine control method of a work machine (hereinafter, appropriately referred to as engine control method) according to an embodiment, and controls the operation state of the engine 36. Hereinafter, when the engine controller 30, the pump controller 33, and the hybrid controller 23 are not distinguished, these controllers may be referred to as engine control device. In an embodiment, the engine controller 30 realizes the function of the engine control device.

A swing lock switch 37 is connected to the hybrid controller 23. The swing lock switch 37 is a switch for operating a swing brake. The swing brake is a mechanical brake for fixing the upper swing body 5 not to allow the upper swing body 5 to swing. When the swing lock switch 37 is turned ON, the hybrid controller 23 commands an operation of the swing brake. When the swing brake is operated, the swing brake fixes the upper swing body 5. When the swing lock switch 37 is turned OFF, the hybrid controller 23 commands cancellation of the swing brake, and the swing brake cancels the fixation of the upper swing body 5.

In an embodiment, a monitor 38 is connected to the in-vehicle LAN 35. The monitor 38 includes a display unit 38M and an operation unit 38SW, and displays information related to the state of the excavator 1, for example, the rotation speed of the internal-combustion engine 17, cooling water temperature of the internal-combustion engine 17, the temperature of the hydraulic oil ejected by the hydraulic pump 18, the temperature of the storage device 22, and the like. The operation unit 38SW is a mechanism for switching an operation mode of the excavator 1, and displaying various menus and prompting selection. An example of the operation mode of the excavator 1 includes a diagnosis mode to diagnose the state of the excavator 1. The diagnosis mode is a mode to diagnose states of the engine 36 and the hydraulic pump 18 included in the excavator 1, and diagnose whether the states thereof are normal. The operation mode of the excavator 1 is not limited to the example in an embodiment, and various operation modes exist other than the example. The operation mode of the excavator 1 may be switched by an operation mode switching switch installed in the operator's cab 6 of the excavator 1 illustrated in FIG. 1, other than the operation unit 38SW of the monitor 38.

<Control of Engine 36>

Figure 3:
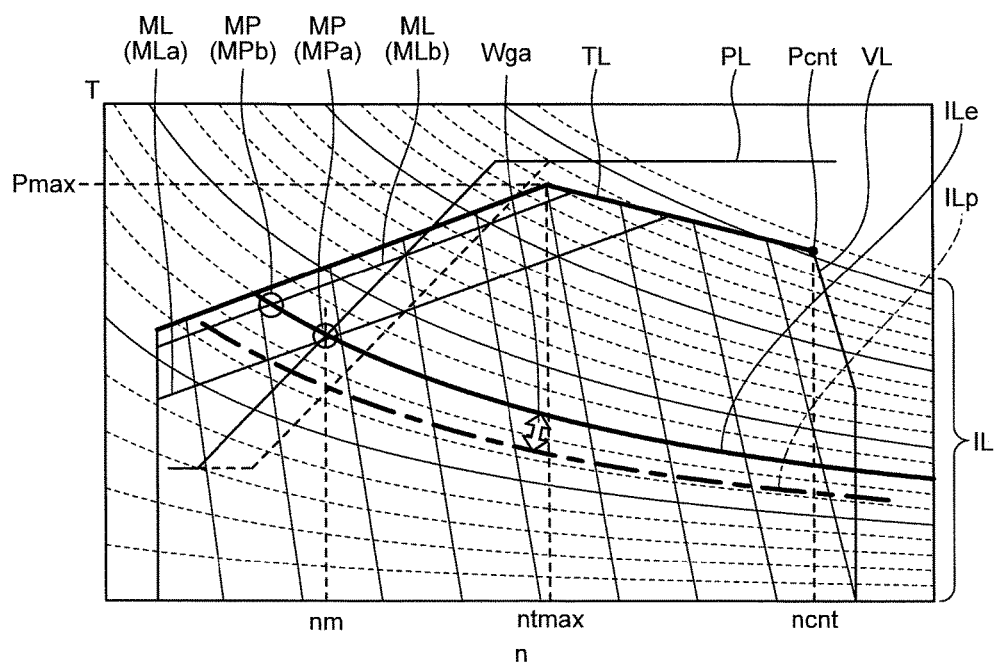
FIG. 3 is a diagram illustrating an example of a torque line diagram used for control of an engine of an embodiment.

FIG. 3 is a diagram illustrating an example of a torque line diagram used for control of the engine 36 according to an embodiment. The torque line diagram is used for control of the engine 36, to be specific, the internal-combustion engine 17. The torque line diagram illustrates a relationship between a torque T (N×m) of the output shaft 17S of the internal-combustion engine 17, and the rotation speed n (rpm: rev/min) of the output shaft 17S. In an embodiment, since the rotor 19R of the generator motor 19 is connected to the output shaft 17S of the internal-combustion engine 17, the rotation speed n of the output shaft 17S of the internal-combustion engine 17 is equal to a rotation speed of the rotor 19R of the generator motor 19. Hereinafter, referring to the rotation speed n means at least one of the rotation speed of the output shaft 17S of the internal-combustion engine 17 and the rotation speed of the rotor 19R of the generator motor 19. In an embodiment, the output of the internal-combustion engine 17 and an output of when the generator motor 19 is operated as a motor are horsepower, and a unit is power. The output of when the generator motor 19 is operated as a generator is electric power, and a unit is power.

The torque line diagram includes a maximum torque line TL, a limit line VL, a pump suction torque line PL, a matching route ML, and an output instruction line IL. The maximum torque line TL illustrates a maximum output that can be generated by the internal-combustion engine 17 during the operation of the excavator 1 illustrated in FIG. 1. The maximum torque line TL illustrates a relationship between the rotation speed n of the internal-combustion engine 17, and the torque T that can be generated by the internal-combustion engine 17 in each rotation speed n.

The torque line diagram is used for control of the internal-combustion engine 17. In an embodiment, the engine controller 30 stores the torque line diagram in the storage unit, and uses the diagram for control of the internal-combustion engine 17. At least one of the hybrid controller 23 and the pump controller 33 may store the tongue line diagram in the storage unit.

The torque T of the internal-combustion engine 17 illustrated by the maximum torque line TL is determined in consideration of durability, smoke limitation, and the like of the internal-combustion engine 17. Therefore, the internal-combustion engine 17 can generate a larger torque than the torque T corresponding to the maximum torque line TL. In reality, the engine control device, for example, the engine controller 30 controls the internal-combustion engine 17 such that the torque T of the internal-combustion engine 17 does not exceed the maximum torque line TL.

In an intersection point Pcnt of the limit line VL and the maximum torque line TL, the output generated by the internal-combustion engine 17, that is, the horsepower is maximized. The intersection point Pcnt is referred to as rated point. The output of the internal-combustion engine 17 in the rated point Pcnt is referred to as rated output. The maximum torque line TL is determined from the smoke limitation, as described above. The limit line VL is determined based on a maximum rotation speed. Therefore, the rated output is a maximum output of the internal-combustion engine 17, which is determined based on the smoke limitation and the maximum rotation speed of the internal-combustion engine 17.

The limit line VL limits the rotation speed n of the internal-combustion engine 17. That is, the rotation speed n of the internal-combustion engine 17 is controlled by the engine control device, for example, the engine controller 30 not to exceed the limit line VL. The limit line VL defines the maximum rotation speed of the internal-combustion engine 17. That is, the engine control device, for example, the engine controller 30 controls the maximum rotation speed of the internal-combustion engine 17 not to become overspeed exceeding the rotation speed defined by the limit line VL.

The pump suction torque line PL illustrates a maximum torque that can be sucked by the hydraulic pump 18 illustrated in FIG. 2 with respect to the rotation speed n of the internal-combustion engine 17. In an embodiment, the internal-combustion engine 17 makes a balance of the output of the internal-combustion engine 17 and a load of the hydraulic pump 18 on the matching route ML. FIG. 3 illustrates a matching route MLa and a matching route MLb. The matching route MLb is closer to the maximum torque line TL than the matching route MLa.

The matching route MLb is set to have a lower rotation speed n than the matching route MLa, for example, in a case of the same output when the internal-combustion engine 17 is operated with a predetermined output. In doing so, when the internal-combustion engine 17 generates the same torque T, the matching route MLb can operate the internal-combustion engine 17 at a lower rotation speed n. Therefore, a loss due to internal friction of the internal-combustion engine 17 can be decreased. The matching route ML may be set to pass a point where a fuel consumption rate is good. The matching route MLb is set to be from 80% to 95%, both inclusive, of the torque T determined by the maximum torque line TL in a range up to when the internal-combustion engine 17 generates the maximum torque T.

In the matching route ML, when the rotation speed n of the internal-combustion engine 17 is increased, the torque T is increased. The matching route ML and the limit line TL intersect in a region between a rotation speed ntmax in a case of a maximum torque point Pmax defined by the limit line TL, and a rotation speed ncnt in a case of the rated output point Pcnt. In the maximum torque point Pmax, the torque T generated by the internal-combustion engine 1 becomes maximized.

The output instruction line IL illustrates targets of the rotation speed n and the torque T of the internal-combustion engine 17. That is, the internal-combustion engine 17 is controlled to have the rotation speed n and the torque T obtained from the output instruction line IL. As described above, the output instruction line IL corresponds to a second relationship that indicates a relationship between the torque T and the rotation speed n of the internal-combustion engine 17, which is used to define the magnitude of the power generated by the internal-combustion engine 17. The output instruction line IL serves as the horsepower generated by the internal-combustion engine 17, that is, a command value of the output (hereinafter, appropriately referred to as output command value). That is, the engine control device, for example, the engine controller 30 controls the torque T and the rotation speed n of the internal-combustion engine 17 to become the torque T and the rotation speed n on the output instruction line IL corresponding to the output command value. For example, when an output instruction line ILe corresponds to the output command value, the torque T and the rotation speed n of the internal-combustion engine 17 are controlled to become the values on the output instruction line ILe.

The torque line diagram includes a plurality of output instruction lines IL. A value between the adjacent output instruction lines IL is obtained by interpolation, for example. In an embodiment, the output instruction line IL is an iso-horsepower line. The iso-horsepower line defines the relationship between the torque T and the rotation speed n so that the output of the internal-combustion engine 17 becomes constant. In an embodiment, the output instruction line IL is not limited to the iso-horsepower line, and may be an arbitrary line defined by a throttle line or the like set with the throttle dial 28.

In an embodiment, the internal-combustion engine 17 is controlled to have the torque T and a rotation speed nm of a matching point MP. The matching point MP is an intersection point of the matching route ML illustrated by the solid line in FIG. 3, the output instruction line ILe illustrated by the solid line in FIG. 3, and the pump suction torque line PL illustrated by the solid line. The matching point MP is a point at which the output of the internal-combustion engine 17 and the load of the hydraulic pump 18 are balanced. The output instruction line ILe illustrated by the solid line corresponds to an output target of the internal-combustion engine 17, which is sucked by the hydraulic pump 18 at the matching point MP, and an output targeted by the internal-combustion engine 17.

In a case where the generator motor 19 generates electricity, a command is provided to the pump controller 33 and the hybrid controller 23 so that the output of the internal-combustion engine 17, which is sucked by the hydraulic pump 18, becomes small by the horse power sucked by the generator motor 19, that is, a power generation output Wga. The pump suction torque line PL is moved to the position illustrated by the dotted line. It is an output instruction line ILp that corresponds to an output of that time. The pump suction torque line PL intersects with the output instruction line ILp at a rotation speed nm at a matching point MPa. It is the output instruction line ILe that passes the matching point MPa, the line ILe being obtained by adding the power generation output Wga sucked by the generator motor 19 to the output instruction line ILp.

In an embodiment, an example in which the output of the internal-combustion engine 17 and the load of the hydraulic pump 18 are balanced at the matching point MPa that is an intersection of the matching route ML1, the output instruction line ILe, and the pump suction torque line PL has been described. However, an embodiment is not limited to the example, and the output of the internal-combustion engine 17 and the load of the hydraulic pump 18 may be balanced at a matching point MPb that is an intersection of the matching route MLb, the output instruction line ILe, and the pump suction torque line PL.

As described above, the engine 36, that is, the internal-combustion engine 17 and the generator motor 19 are controlled based on the maximum torque line TL, the limit line VL, the pump suction torque line PL, the matching route ML, and the output instruction line IL included in the torque line diagram. Next, control of the engine 36, to be specific, control of the internal-combustion engine 17, at the time of relief of the hydraulic oil, that is, in a case where the hydraulic oil ejected by the hydraulic pump 18 is relieved from the relief valve 18*r*, will be described.

<Control of Internal-Combustion Engine 17 at the Time of Relief of Hydraulic Oil>

At the time of confirmation of performance of the excavator 1 before the excavator 1 is shipped from a factory, and at the time of diagnosis of failure by a service person, whether the internal-combustion engine 17 and the hydraulic pump 18 have abnormalities using the diagnosis mode. To be specific, in the diagnosis mode, an implement relief operation is performed after the process enters the diagnosis mode, and the rotation speed n of the internal-combustion engine 17 is increased and the suction torque and the ejection flow rate of the hydraulic pump 18 are increased. In the diagnosis mode, under this state, whether the internal-combustion engine 17 and the hydraulic pump 18 have abnormalities is determined according to whether the rotation speed n of the internal-combustion engine 17 in the relief of the hydraulic oil is stabilized within a determination value. Therefore, in a normal time, that is, when there are no abnormalities, the rotation speed n of the internal-combustion engine 17 at the time of relief of the hydraulic oil needs to be constant. The implement relief operation is an operation to further move at least one of the operation levers 26R, 26L in the same direction in a state where at least one of the boom cylinder 14, the arm cylinder 15, and the bucket cylinder 16, of the implement 3, is at a stroke end. With the operation, the pressure of the hydraulic oil in the piping in which the hydraulic oil flows is increased, and the hydraulic oil is relieved. The pressure of the hydraulic oil is detected by the pump pressure detection unit 20*a* illustrated in FIG. 2.

The generator motor 19 starts to generate the electric power, that is, starts to generate electricity, during the implement relief operation, so that an output command value is increased by an output to drive the generator motor 19. With the increase in the output command value, a target rotation speed nmt targeted by the internal-combustion engine 17 is increased. The target rotation speed nmt is a rotation speed determined from an intersection of the output command value of the internal-combustion engine 17 and the matching route ML, the output command value being a total of the pump suction torque that is a torque sucked by the hydraulic pump 18 and the power generation output Wga.

To suppress the increase in the rotation speed n during the implement relief operation, in an embodiment, the target rotation speed nmt is fixed to the rotation speed nmr targeted by the internal-combustion engine 17 when the generator motor 19 generates a maximum generation power Wgmax at the time of relief of the hydraulic oil. This control is herein appropriately referred to as control at relief time. During the control at relief time, the target rotation speed nmt is determined based on horsepower necessary when the generator motor 19 generates maximum electric power, and horsepower sucked by the hydraulic pump 18 when the hydraulic oil ejected by the hydraulic pump 18 is relieved.

Figure 4:
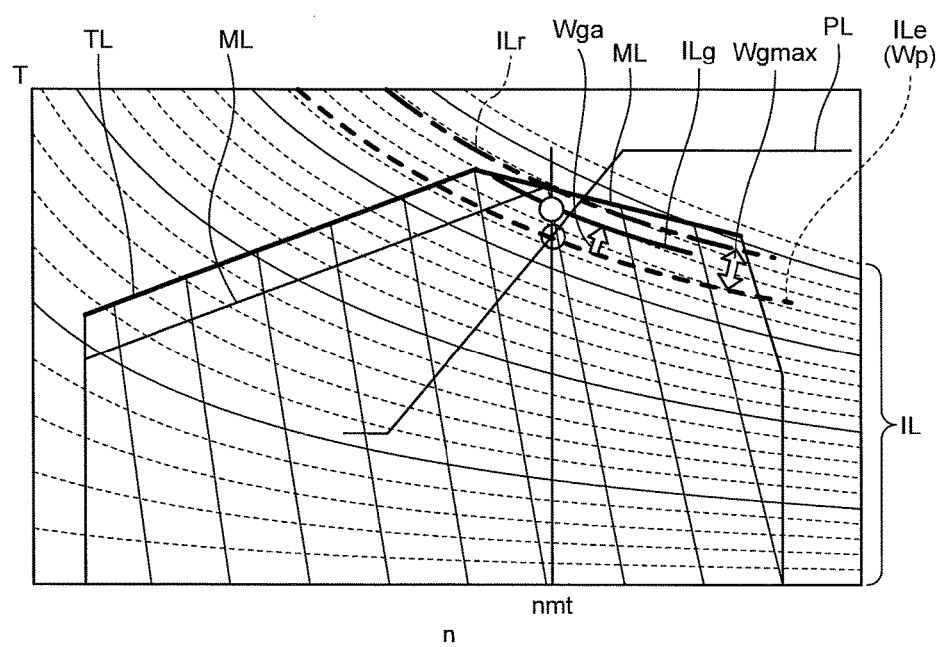
FIG. 4 is a diagram for describing control at relief time.

FIG. 4 is a diagram for describing the control at relief time. The output instruction line ILe of FIG. 4 is an output instruction line of when the internal-combustion engine 17 is solely operated. In FIG. 4, when the internal-combustion engine 17 drives the hydraulic pump 18 in a state where the generator motor 19 does not generate electricity, the output command value provided to the internal-combustion engine 17 is illustrated by the output instruction line ILe. Horsepower Wp determined by the output instruction line ILe is the horsepower sucked by the hydraulic pump 18.

The output command value provided to the internal-combustion engine 17 of when the internal-combustion engine 17 drives the hydraulic pump 18 in a state where the generator motor 19 generates electricity is illustrated by an output instruction line ILg. When the generator motor 19 is generating electricity, energy for generation is necessary. Therefore, the output instruction line ILg at the time of generation of electricity becomes larger than the output instruction line ILe at the time of non-generation of electricity by the power generation output Wga. That is, the internal-combustion engine 17 generates a larger output at the time of generation of electricity than at the time of non-generation of electricity.

During the control at relief time, the output command value provided by the engine controller 30 to the internal-combustion engine 17 is illustrated by an output instruction line ILr. The output instruction line ILr is an output command value provided to the internal-combustion engine 17 when the internal-combustion engine 17 drives the hydraulic pump 18 in a state where the generator motor 19 generates the maximum electric power, that is, the maximum power generation output Wgmax. The horsepower determined by the output instruction line ILr becomes a value obtained by adding the horsepower corresponding to the maximum power generation output Wgmax, that is, the horsepower having the same power as the maximum power generation output Wgmax to the horsepower Wp sucked by the hydraulic pump 18. In an embodiment, the maximum power generation output Wgmax is a fixed value, and is stored in the storage unit of the engine controller 30.

In an embodiment, as the horsepower Wp sucked by the hydraulic pump 18, a value determined according to a drive condition of the hydraulic pump 18 is used. In this case, the horsepower Wp sucked by the hydraulic pump 18 is not a fixed value, and is changed according to the drive condition of the hydraulic pump 18. As the horsepower Wp sucked by the hydraulic pump 18, maximum horsepower that can be sucked by the hydraulic pump 18, that is, maximum suction horsepower Wpmax may be used. The maximum suction horsepower Wpmax is uniquely determined, and is a fixed value. In a case where the maximum suction horsepower Wpmax is used for control at relief time, the maximum suction horsepower Wpmax is stored in the storage unit of the engine controller 30.

In the control at relief time in a case where the internal-combustion engine 17 drives the generator motor 19, the engine controller 30 determines a target rotation speed nmr based on the horsepower necessary when the generator motor 19 generates the maximum electric power, that is, the horsepower corresponding to the maximum power generation output Wgmax, and the horsepower Wp sucked by the hydraulic pump 18. To be specific, the engine controller 30 adds the horsepower Wp sucked by the hydraulic pump 18 and the maximum power generation output Wgmax to obtain the output instruction line ILr corresponding to the output command value, and employs the rotation speed in the intersection point of the output instruction line ILr and the matching route ML as the target rotation speed nmr. In an embodiment, the matching route ML is matched with the maximum torque line TL in a range larger than the rotation speed n at which the internal-combustion engine 17 generates the maximum torque T.

The rotation speed n of the internal-combustion engine 17 is matched at the target rotation speed nmt that is a rotation speed at which the output command value and the output of the internal-combustion engine 1, that is, a sum of the target pump suction horsepower and the power generation output Wga is balanced. When the rotation speed n of the internal-combustion engine 17 becomes the target rotation speed nmt or more, the pump suction horsepower rises along the pump suction torque line PL, and the output required by the internal-combustion engine 17 becomes larger than the output command value for the internal-combustion engine 17. The internal-combustion engine 17 consumes the rotational energy by an amount falling short of a required output, and thus the rotation speed n is decreased. When the rotation speed n of the internal-combustion engine 17 is decreased, the pump suction horsepower is decreased along the pump suction torque line PL, and the output required by the internal-combustion engine 17 becomes smaller than the output command value for the internal-combustion engine 17. Then, in the internal-combustion engine 17, a residual output, that is, a difference between the output command value for the internal-combustion engine 17 and the output required by the internal-combustion engine 17 serves as energy that raises the rotation speed n, and thus the rotation speed n rises.

In the control at relief time, the internal-combustion engine 17 is operated at the target rotation speed nmr. When the generator motor 19 starts to generate electricity, the output command value illustrated by the output instruction line ILg is provided to the internal-combustion engine 17. Even in this case, the engine controller 30 operates the internal-combustion engine 17 at the target rotation speed nmr, and thus even when the generator motor 19 starts to generate electricity at the time of relief of the hydraulic oil, the rotation speed n of the internal-combustion engine 17 is not changed. Therefore, a service person or the like can reliably and accurately diagnose the excavator 1, to be specific, the internal-combustion engine 17 and the hydraulic pump 18.

Figure 5:
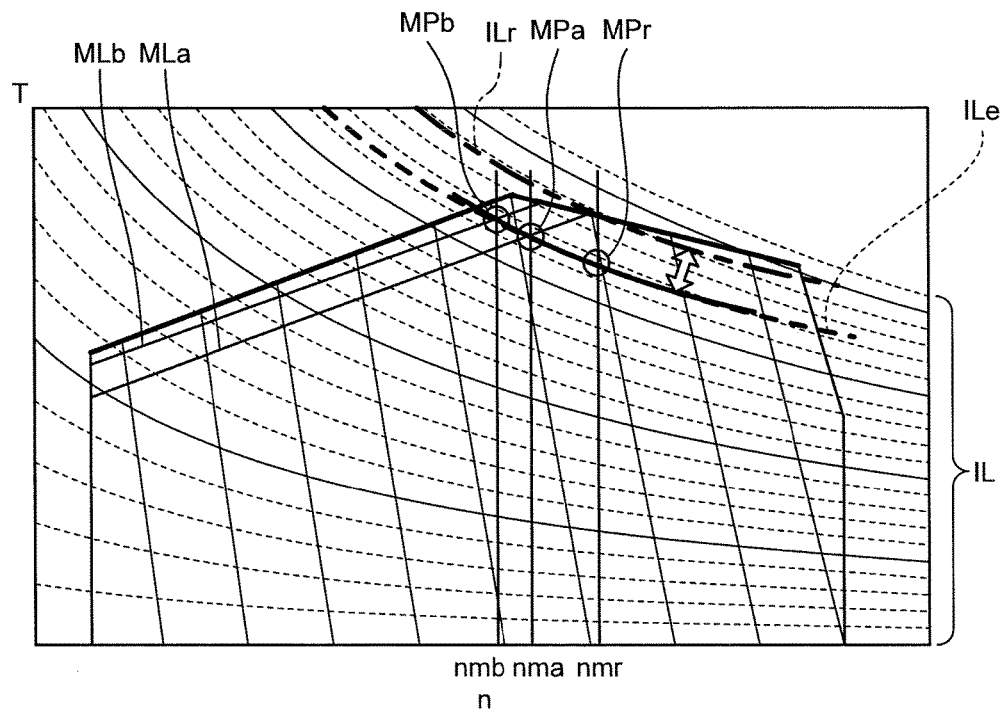
FIG. 5 is a diagram for describing an operation of an internal-combustion engine in a case where control at relief time is executed at the time of relief of a hydraulic oil.

FIG. 5 is a diagram for describing the operation of the internal-combustion engine 17 of a case where the control at relief time is executed at the time of relief of the hydraulic oil. In a case where the internal-combustion engine 17 is operated at the matching point MPa that is an intersection point of the matching route MLa and the output instruction line ILe, when the control at relief time is started by the relief of the hydraulic oil, the internal-combustion engine 17 is operated at a matching point MPr. The matching point MPr is determined from the target rotation speed nmr at an intersection point of the output instruction line ILr and the matching route ML used for the control at relief time, and the torque T obtained from the output instruction line ILe at the target rotation speed nmr.

For the internal-combustion engine 17 operated at the matching point MPa, the control at relief time is started, and the internal-combustion engine 17 is operated at the matching point MPr. Therefore, when the control at relief time is started for the internal-combustion engine 17, the target rotation speed rises from nma to nmr.

Meanwhile, the matching route MLb is closer to the maximum torque line TL than the matching route MLa. For the internal-combustion engine 17 operated at the matching point MPb, the control at relief time is started, and the internal-combustion engine 17 is operated at the matching point MPr. Therefore, when the control at relief time is started for the internal-combustion engine 17, the target rotation speed rises from nmb to nmr.

In a case where the internal-combustion engine 17 is operated at the matching point MPb that is an intersection point of the matching route MLb and the output instruction line ILe, a target rotation speed nmb is lower than the target rotation speed nma at the matching point MPa. Therefore, in a case where the internal-combustion engine 17 is controlled with the matching route MLb, the magnitude by which the rotation speed n of the internal-combustion engine 17 rises when the control at relief time is started becomes larger than that of a case where the internal-combustion engine 17 is controlled with the matching route MLa. As a result, when the control at relief time is started in the case where the internal-combustion engine 17 is controlled with the matching route MLb, the rise of the rotation speed n of the internal-combustion engine 17 is large, and uncomfortable feeling is provided to the operator of the excavator 1.

When the excavator 1 is moved from an operation called down swing, in which the excavator 1 lowers the boom 11 of the implement 3 while causing the upper swing body 5 to swing, to the excavation, the relief of the hydraulic oil easily occurs. Therefore, in a case where the internal-combustion engine 17 is controlled with the matching route MLb, the control at relief time is started when the excavator 1 is moved from the down swing to the excavation. As a result, the rise of the rotation speed n of the internal-combustion engine 17 may provide the uncomfortable feeling to the operator of the excavator 1.

To suppress the rise of the rotation speed n of the internal-combustion engine 17 occurring when the excavator 1 is moved from the down swing onto the excavation, the engine controller 30 disables the control at relief time at the time of work including swing of the upper swing body 5. To be specific, when the swing lock switch 37 illustrated in FIG. 2 is OFF, there is a possibility that the upper swing body 5 swings. Therefore, the engine controller 30 recognizes that it is a time of swing lock, which is a case where the swing of the upper swing body 5 is fixed when the swing lock switch 37 is ON, and enables the control at relief time. The engine controller 30 then recognizes that there is a possibility that the upper swing body 5 swings when the swing lock switch 37 is OFF, and disables the control at relief time.

In doing so, when the excavator 1 is moved from the down swing to the excavation, the rise of the rotation speed n of the internal-combustion engine 17 is suppressed. That is, when the control at relief time is disabled, in a case where the internal-combustion engine 17 is operated at the matching point MPb, even if, for example, the excavator 1 is moved from the down swing to the excavation and the hydraulic oil is relieved, the internal-combustion engine 17 is operated at the matching point MPb. Therefore, the target rotation speed nmb of the internal-combustion engine 17 at the matching point MPb is not changed. As a result, a phenomenon that the rotation speed n of the internal-combustion engine 17 rises at the time of work associated with swing of the upper swing body 5 is suppressed.

Further, the engine controller 30 also enables the control at relief time at the time of diagnosis, which is a case of diagnosing the excavator 1. In doing so, both intention to execute the control at relief time when diagnosing the excavator 1, and suppression of the rise of the rotation speed n of the internal-combustion engine 17 at the time of work associated with swing of the upper swing body 5 can be achieved.

The control at relief time is executed when a condition to make the rotation speed n of the internal-combustion engine 17 a constant value is established, for example, when a condition that does not require work with the implement is established, in the excavator 1. Hereinafter, the condition to make the rotation speed n of the internal-combustion engine 17 a constant value is appropriately referred to as constant speed condition. The condition that does not require work with the implement is included in the constant speed condition. Hereinafter, the condition that does not require work with the implement is appropriately referred to as no work required condition. The control at relief time is executed when the constant speed condition is established, for example, when the no work required condition is established, and the rotation speed n of the internal-combustion engine 17 is held to a constant value and the internal-combustion engine 17 is operated.

In a case where the excavator 1 is a hybrid work machine including the generator motor 19 and the storage device 22, there is a possibility that the rotation speed n of the internal-combustion engine 17 cannot be held to the constant value due to the rise of the rotation speed n of the internal-combustion engine 17 due to the start of the generation of electricity by the generator motor 19 during the implement relief operation. Further, the operator has uncomfortable feeling due to the rotation speed n of the internal-combustion engine 17 being not held to the constant value. This is a unique problem to the case where the excavator 1 is a hybrid work machine.

Further, in the case where the excavator 1 is a hybrid work machine, when the internal-combustion engine 17 is controlled with the matching route MLb, the control at relief time is started when the excavator 1 is moved from the down swing to the excavation. As a result, there is a possibility that the rise of the rotation speed n of the internal-combustion engine 17 provides the uncomfortable feeling to the operator.

The engine controller 30 enables the control at relief time when the no work required condition, in the present embodiment, a condition where the swing lock switch 37 is ON and a condition where the excavator 1 is diagnosed are established, that is, when there is a request to hold the rotation speed n of the internal-combustion engine 17 to a constant value. In doing so, both (1) that the diagnosis can be smoothly performed when the control at relief time at the time of diagnosis is required in the case where the excavator 1 is a hybrid work machine, and (2) that the rise of the rotation speed n of the internal-combustion engine 17 at the time of work associated with swing of the upper swing body 5 is suppressed, can be achieved. That is, the control of an embodiment has an advantage to solve the problem unique to the hybrid work machine. Further, there is a case of performing the diagnosis of the hydraulic pump 18 in a circumstance where the upper swing body 5 swings. Therefore, establishment of one of the condition where the swing lock switch 37 is ON and the condition where the excavator 1 is diagnosed may be employed as the condition of the control at relief time, in accordance with the content of the diagnosis of the hydraulic pump 18, such as enabling the control at relief time if at least the condition where the excavator 1 is diagnosed is established.

<Configuration Example of Engine Controller 30>

Figure 6:
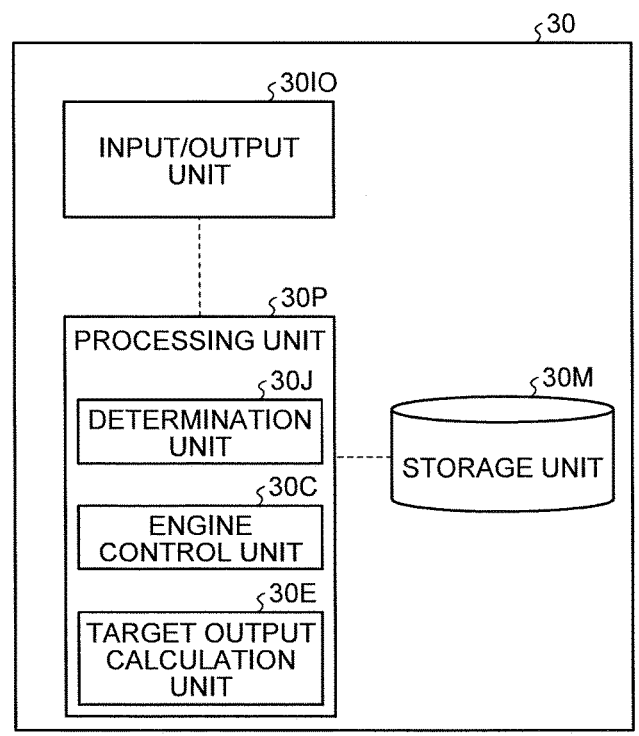
FIG. 6 is a diagram illustrating a configuration example of an engine controller.

FIG. 6 is a diagram illustrating a configuration example of the engine controller 30. The engine controller 30 includes a processing unit 30P, a storage unit 30M, and an input/output unit 30IO. The processing unit 30P is a central processing unit (CPU), a microprocessor, a microcomputer, or the like.

In an embodiment, the processing unit 30P includes a determination unit 30J, an engine control unit 30C, and a target output calculation unit 30E. The processing unit 30P, to be specific, the determination unit 30J, the engine control unit 30C, and the target output calculation unit 30E executes the engine control method of a work machine according to an embodiment. The determination unit 30J determines whether the no work required condition is established, in an embodiment, whether it is the time of diagnosis, which is the case of diagnosing the excavator 1, and whether it is the time of swing lock, which is the case of fixing the swing of the upper swing body 5. When the no work required condition is established, in an embodiment, when at least one of the time of diagnosis or the time of swing lock is established, the engine control unit 30C enables the control at relief time. The control at relief time is, as described above, control to determine the target rotation speed nmt targeted by the internal-combustion engine 17, based on the horsepower necessary when the generator motor 19 generates the maximum electric power and the horsepower sucked by the hydraulic pump 18, when the hydraulic oil ejected by the hydraulic pump 18 is relieved from the relief valve 18r. When the no work required condition is not established, in an embodiment, when both the time of diagnosis and the time of swing lock are not established, the engine control unit 30C disables the control at relief time. The target output calculation unit 30E obtains the target output (target horsepower) of the internal-combustion engine 17 and the horsepower sucked by the hydraulic pump 18.

In a case where the processing unit 30P is special hardware, for example, one of or a combination of various circuits, a programmed processor, and an application specific integrated circuit (ASIC) corresponds to the processing unit 30P.

As the storage unit 30M, at least one of various nonvolatile or volatile memories such as a random access memory (RAM) and a read only memory (ROM), and various disks such as a magnetic disk is used. The storage unit 30M stores a computer program for causing the processing unit 30P to execute the engine control according to an embodiment, and information used when the processing unit 30P executes the engine control according to an embodiment. The processing unit 30P realizes the engine control according to an embodiment by reading the computer program from the storage unit 30M and executing the computer program.

The input/output unit 30IO is an interface circuit for connecting the engine controller 30 and devices. The fuel adjustment dial 28, the rotation speed detection sensor 17n, and the common rail control unit 32 illustrated in FIG. 2 are connected to the input/output unit 30IO. In an embodiment, a configuration example of the engine controller 30 has been described. However, the hybrid controller 23 and the pump controller 33 also have a similar configuration to the engine controller 30.

<Control Block of Engine Controller 30>

Figure 7:
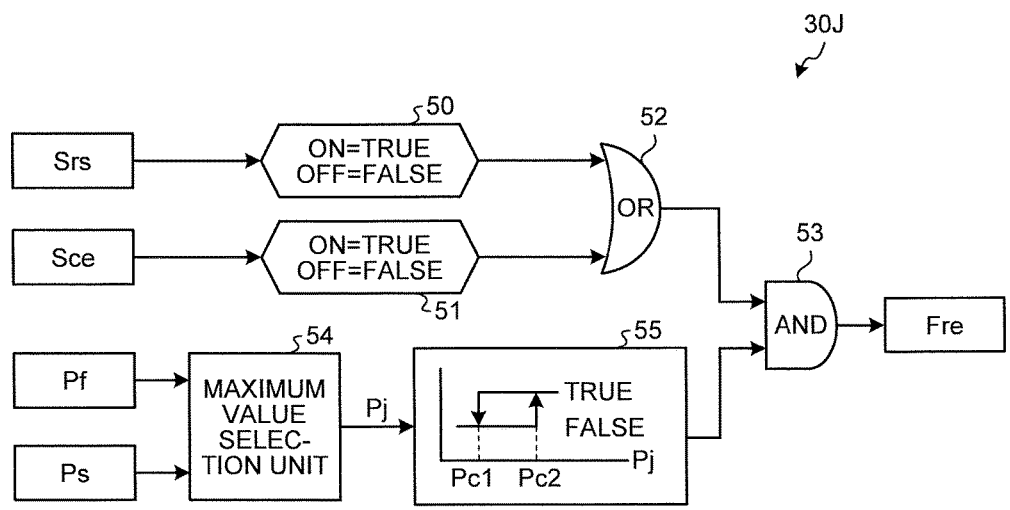
FIG. 7 is a control block diagram of a determination unit included in an engine controller.

FIG. 7 is a control block diagram of the determination unit 30J included in the engine controller 30. The determination unit 30J includes a swing state output unit 50, an operation mode output unit 51, a logical sum calculation unit 52, a logical product calculation unit 53, a maximum value selection unit 54, and a relief determination unit 55.

The swing state output unit 50 acquires an output Srs of the swing lock switch 37 illustrated in FIG. 2. The swing state output unit 50 outputs TRUE to the logical sum calculation unit 52 when the output Srs is ON, that is, when the swing lock switch 37 is ON, and outputs FALSE to the logical sum calculation unit 52 when the output Srs is OFF, that is, when the swing lock switch 37 is OFF.

The operation mode output unit 51 acquires a diagnosis mode execution output Sce output from the monitor 38 illustrated in FIG. 2. The operation mode output unit 51 outputs TRUE to the logical sum calculation unit 52 when the diagnosis mode execution output Sce is ON, that is, when the diagnosis is performed, and output FALSE to the logical sum calculation unit 52 when the diagnosis mode execution output Sce is OFF, that is, the diagnosis is not performed.

The logical sum calculation unit 52 calculates a logical sum of the output value of the swing state output unit 50 and the output value of the operation mode output unit 51, and outputs a calculation result to the logical product calculation unit 53. The logical sum calculation unit 52 outputs FALSE when both the output value of the swing state output unit 50 and the output value of the operation mode output unit 51 are FALSE, and outputs TRUE otherwise.

A pressure Pf of the hydraulic oil ejected by one hydraulic pump 18 detected by the pump pressure detection unit 20a illustrated in FIG. 2, and a pressure Ps of the hydraulic oil ejected by the other hydraulic pump 18 are input to the maximum value selection unit 54. The maximum value selection unit 54 compares the input pressure Pf and pressure Ps, and outputs the larger pressure to the relief determination unit 55 as a determination pressure Pj.

In an embodiment, the excavator 1 includes two hydraulic pumps 18, 18. However, when there are three or more hydraulic pumps 18, the pressures of the hydraulic oil ejected by the respective hydraulic pumps 18 are input to the maximum value selection unit 54. When the number of the hydraulic pumps 18 included in the excavator 1 is one, the maximum value selection unit 54 is unnecessary. In this case, the pressure of the hydraulic oil ejected by the one hydraulic pump 18 is input to the relief determination unit 55 as the determination pressure Pj.

The relief determination unit 55 determines whether it is in the relief state using a first threshold Pc1 and a second threshold Pc2 that is larger than the first threshold Pc1. The relief determination unit 55 outputs TRUE to the logical product calculation unit 53 when the determination pressure Pj becomes the second threshold Pc2 or more, and outputs FALSE to the logical product calculation unit 53 when the determination pressure Pj becomes the first threshold Pc1 or less in a state of outputting TRUE. As described above, a hysteresis is given to determination of the relief state, whereby occurrence of hunting is suppressed at the time of determination of the relief state.

The logical product calculation unit 53 outputs a control at relief time enable flag Fre. The logical product calculation unit 53 calculates a logical product of the output of the logical sum calculation unit 52 and the output of the relief determination unit 55. The logical product calculation unit 53 sets TRUE to the control at relief time enable flag Fre when both the output value of the logical sum calculation unit 52 and the output value of output of the relief determination unit 55 are TRUE, and sets FALSE to the control at relief time enable flag Fre otherwise. When the control at relief time enable flag Fre is TRUE, the control at relief time is enabled, and when the control at relief time enable flag Fre is FALSE, the control at relief time is disabled.

Figure 8:
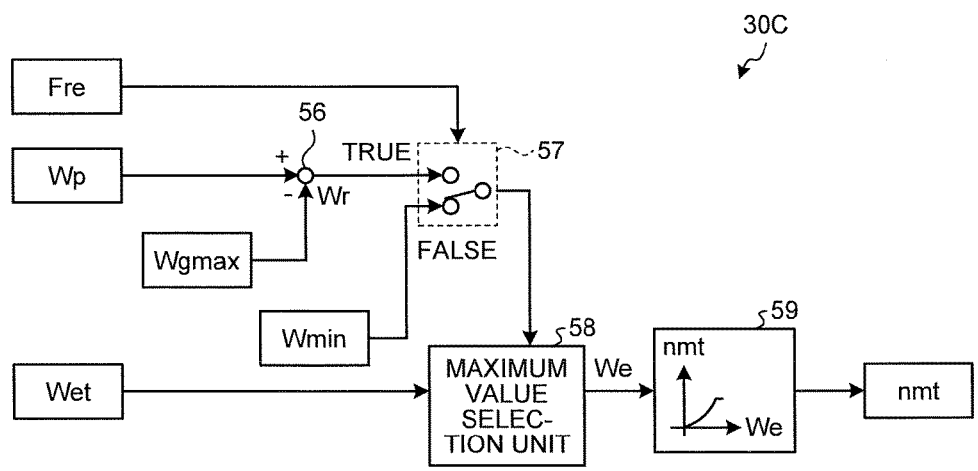
FIG. 8 is a control block diagram of an engine control unit included in an engine controller.

FIG. 8 is a control block diagram of the engine control unit 30C included in the engine controller 30. The engine control unit 30C includes an addition/subtraction unit 56, a selection unit 57, a maximum value selection unit 58, and a target rotation speed calculation unit 59. Pump suction horsepower Wp that is horsepower sucked by the hydraulic pump 18 and the maximum power generation output Wgmax are input to the addition/subtraction unit 56. In an embodiment, since the horsepower necessary to drive the generator motor 19 when the generator motor 19 generates electricity is expressed by a negative value, the maximum power generation output Wgmax is a negative value. The pump suction horsepower Wp is a value determined according to the drive condition of the hydraulic pump 18, and in an embodiment, the target output calculation unit 30E illustrated in FIG. 6 obtains the pump suction horsepower Wp.

The addition/subtraction unit 56 subtracts the maximum power generation output Wgmax from the pump suction horsepower Wp, and outputs the result to the selection unit 57. As described above, the maximum power generation output Wgmax is a negative value, and thus an output of the addition/subtraction unit 56 is a value obtained by adding an absolute value of the maximum power generation output Wgmax to an absolute value of the pump suction horsepower Wp. This value is horsepower corresponding to the output instruction line ILr illustrated in FIGS. 4 and 5, and is horsepower used for the control at relief time. Hereinafter, the value obtained by adding the absolute value of the pump suction horsepower Wp and the absolute value of the maximum power generation output Wgmax is appropriately referred to as control at relief time horsepower Wr. The value from the addition/subtraction unit 56 and a minimum output (minimum horsepower) Wmin are input to the selection unit 57. The minimum output Wmin is 0 [kW] in an embodiment.

The selection unit 57 outputs one of the input two values to the maximum value selection unit 58 based on the value of the control at relief time enable flag Fre. To be specific, the selection unit 57 selects the output from the addition/subtraction unit 56 and outputs the output to the maximum value selection unit 58 when the control at relief time enable flag Fre is TRUE. Further, the selection unit 57 selects the minimum output Wmin, and outputs the minimum output Wmin to the maximum value selection unit 58 when the control at relief time enable flag Fre is FALSE.

A target output (target horsepower) Wet of the internal-combustion engine 17 and the value output by the selection unit 57 are input to the maximum value selection unit 58. The maximum value selection unit 58 selects the larger one of the target output Wet of the internal-combustion engine 17 and the value output by the selection unit 57, and outputs the selected one to the target rotation speed calculation unit 59 as internal-combustion engine control horsepower We. The target rotation speed calculation unit 59 obtains the target rotation speed nmt from the internal-combustion engine control horsepower We. The target rotation speed nmt is the rotation speed in the intersection point of the output instruction line IL corresponding to the internal-combustion engine control horsepower We and the matching route ML. When the internal-combustion engine control horsepower We is the control at relief time horsepower Wr, the target rotation speed nmt obtained by the target rotation speed calculation unit 59 serves as the target rotation speed nmr used for the control at relief time.

As described above, the engine controller 30 controls the internal-combustion engine 17 using the target rotation speed nmr used for the control at relief time obtained based on the control at relief time horsepower Wr when the control at relief time enable flag Fre is TRUE. That is, the engine controller 30 enables the control at relief time when the control at relief time enable flag Fre is TRUE. The engine controller 30 controls the internal-combustion engine 17 using the target rotation speed nmb obtained using the target output Wet of the internal-combustion engine 17 without using the control at relief time horsepower Wr when the control at relief time enable flag Fre is FALSE. That is, the engine controller 30 disables the control at relief time when the control at relief time enable flag Fre is FALSE.

Figure 9:
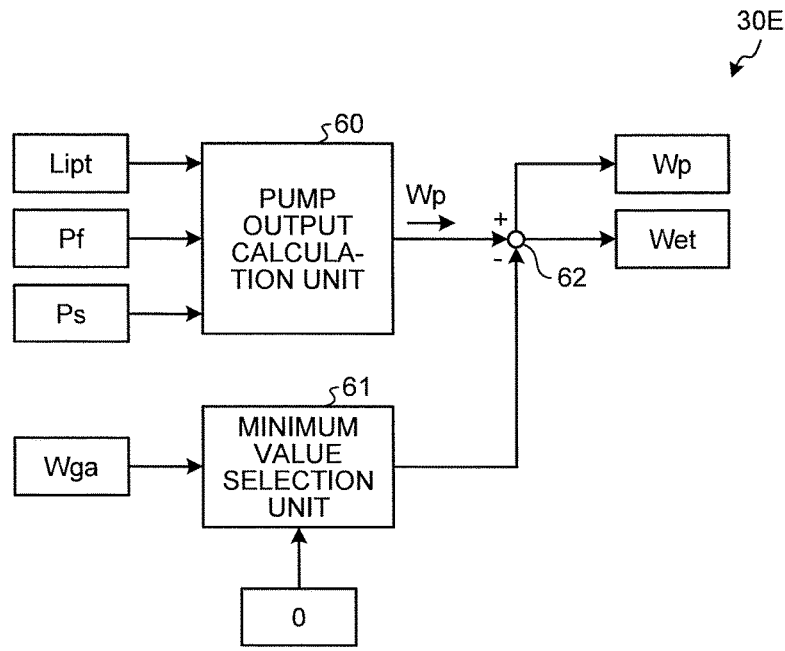
FIG. 9 is a control block diagram of a target output calculation unit included in an engine controller.

FIG. 9 is a control block diagram of the target output calculation unit 30E included in the engine controller 30. The target output calculation unit 30E obtains the target output Wet of the internal-combustion engine 17 and the pump suction horsepower Wp. The target output calculation unit 30E includes a pump output calculation unit 60, a minimum value selection unit 61, and an addition/subtraction unit 62. A lever operation amount Lipt, and the pressures Pf, Ps of the hydraulic oil ejected by the hydraulic pumps 18 are input to the pump output calculation unit 60. The lever operation amount Lipt is a value according to the operation states of the operation levers 26R, 26L and the travel levers 39L, 39R illustrated in FIG. 2. The pump output calculation unit 60 determines a current operation pattern according to the operation states of the operation levers 26R, 26L and the travel levers 39L, 39R, and the pressures Pf, Ps, and obtains the pump suction horsepower Wp for each determined operation pattern. The pump output calculation unit 60 outputs the obtained pump suction horsepower Wp to the addition/subtraction unit 62.

The minimum value selection unit 61 compares the power generation output Wga of the generator motor 19 illustrated in FIG. 2, and 0 [kW], and outputs the smaller one to the addition/subtraction unit 62. In an embodiment, since the horsepower necessary to drive the generator motor 19 when the generator motor 19 generates electricity is expressed by a negative value, the power generation output Wga is a negative value. Therefore, when the generator motor 19 generates electricity, the minimum value selection unit 61 outputs the power generation output Wga to the addition/subtraction unit 62.

The addition/subtraction unit 62 outputs a value obtained by subtracting the power generation output Wga from the pump suction horsepower Wp as the target output Wet of the internal-combustion engine 17. As described above, the power generation output Wga is a negative value, and thus the addition/subtraction unit 62 outputs a value obtained by adding an absolute value |Wp| of the pump suction horsepower Wp and an absolute value |Wga| of the power generation output Wga as the target output Wet of the internal-combustion engine 17.

The power generation output Wga is changed due to a decrease in a voltage between terminals of the storage device 22 by the swing operation to swing the upper swing body 5 or the like. The target output Wet of the internal-combustion engine 17 is also changed in response to the change. The target output Wet of the internal-combustion engine 17 corresponds to a load of the internal-combustion engine 17, which drives the hydraulic pump 18. Therefore, the load of the internal-combustion engine 17 is changed due to the power generation output Wga. As illustrated in FIG.

8, the target rotation speed nmt of the internal-combustion engine 17 is determined according to the target output Wet of the internal-combustion engine 17 in a case of not the control at relief time. That is, the target rotation speed nmt of the internal-combustion engine 17 is changed according to the power generation output Wga changed according to the voltage between terminals of the storage device 22. During the operation of the internal-combustion engine 17, the rotation speed n of the internal-combustion engine 17 is controlled to become the target rotation speed nmt. Therefore, the rotation speed n of the internal-combustion engine 17 is changed according to the power generation output Wga. At the time of execution of the control at relief time, the target rotation speed nmt of the internal-combustion engine 17 becomes a fixed value by the maximum power generation output Wgmax. The target rotation speed nmt is not changed by the power generation output Wga, and thus the rotation speed n of the internal-combustion engine 17 is not changed.

<Engine Control Method of Work Machine According to Embodiment>

Figure 10:
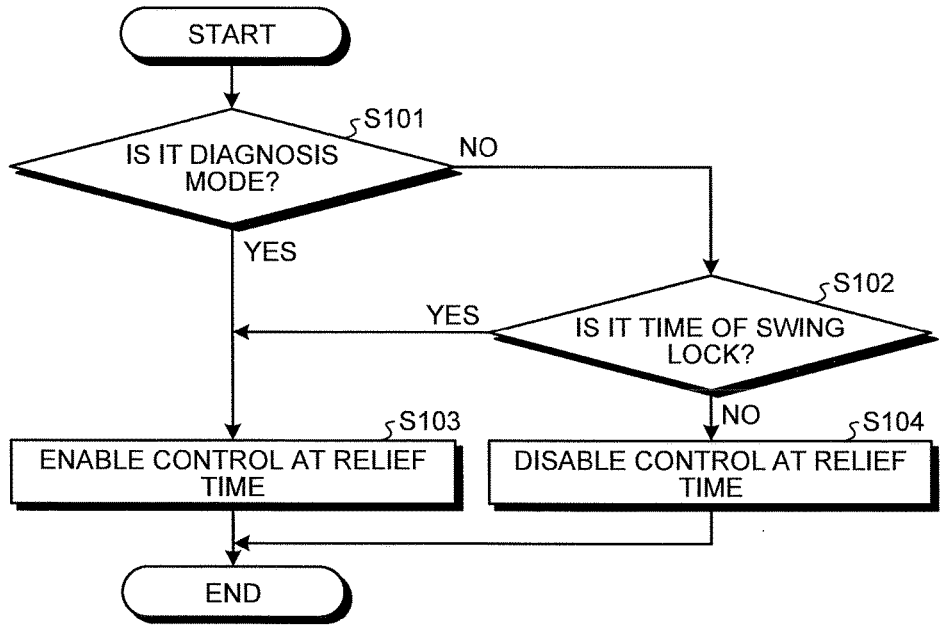
FIG. 10 is a flowchart illustrating an example of an engine control method of a work machine according to an embodiment.

FIG. 10 is a flowchart illustrating an example of an engine control method of a work machine according to an embodiment. In step S101, the determination unit 30J of the engine controller 30 determines whether it is the diagnosis mode. When it is the diagnosis mode (Yes in step S101), the engine controller 30 sets the control at relief time enable flag Fre to be TRUE. In step S103, the engine control unit 30C enables the control at relief time in response to the control at relief time enable flag Fre being TRUE. When it is not the diagnosis mode (No in step S101), in step S102, the determination unit 30J determines whether it is the time of swing lock. When it is the time of swing lock (Yes in step S102), the determination unit 30J sets the control at relief time enable flag Fre to be TRUE. In step S103, the engine control unit 30C enables the control at relief time in response to the control at relief time enable flag Fre being TRUE.

When it is not the diagnosis mode (No in step S101), and it is not the time of swing lock (No in step S102), the determination unit 30J sets the control at relief time enable flag Fre to be FALSE. In step S104, the engine control unit 30C disables the control at relief time in response to the control at relief time enable flag Fre being FALSE.

In an embodiment, a hybrid work machine in which the generator motor 19 is driven by the internal-combustion engine 17 has been described as an example, and the target rotation speed has been determined based on the horsepower necessary when the generator motor 19 generates the maximum electric power and the horsepower sucked by the hydraulic pump 18 in the control at relief time. In an embodiment, the generator motor 19 is not essential. That is, the engine 36 illustrated in FIG. 2 may not include the generator motor 19. In this case, in the control at relief time, the engine controller 30 determines the target rotation speed nmt based on the horsepower Wp sucked by the hydraulic pump 18 when the hydraulic oil ejected by the hydraulic pump 18 is relieved. To be specific, the engine controller 30 obtains the output instruction line ILr as the output command value from the horsepower Wp sucked by the hydraulic pump 18, and employs the rotation speed in the intersection point of the output instruction line ILr and the matching route ML as the target rotation speed nmr.

In an embodiment, the excavator 1 including the internal-combustion engine 17 has been described as an example of a work machine. However, the work machine to which the embodiment can be applied is not limited to the example. For example, the work machine may be a wheel loader, a bull dozer, a dump truck, or the like. The type of the engine mounted in the work machine is not also limited.

Embodiments have been described. However, the embodiment is not limited by the above-described content. Further, the above-described configuration elements include those easily conceived by a person skilled in the art, those substantially the same, and those so-called in the scope of equivalents. Further, the above-described configuration elements can be appropriately combined. Further, various omissions, replacements, and changes of the configuration elements can be performed without departing from the gist of the embodiments.

REFERENCE SIGNS LIST

1 EXCAVATOR
5 UPPER SWING BODY
17 INTERNAL-COMBUSTION ENGINE
18 HYDRAULIC PUMP
18r RELIEF VALVE
19 GENERATOR MOTOR
20 CONTROL VALVE
20a PUMP PRESSURE DETECTION UNIT
22 STORAGE DEVICE
23 HYBRID CONTROLLER
26L, 26R OPERATION LEVER
30 ENGINE CONTROLLER
30C ENGINE CONTROL UNIT
30E TARGET OUTPUT CALCULATION UNIT
30M STORAGE UNIT
30P PROCESSING UNIT
30IO INPUT/OUTPUT UNIT
30J DETERMINATION UNIT
33 PUMP CONTROLLER
36 ENGINE
37 SWING LOCK SWITCH
38 MONITOR
50 SWING STATE OUTPUT UNIT
51 OPERATION MODE OUTPUT UNIT
52 LOGICAL SUM CALCULATION UNIT
53 LOGICAL PRODUCT CALCULATION UNIT
54 MAXIMUM VALUE SELECTION UNIT
55 RELIEF DETERMINATION UNIT
56 ADDITION/SUBTRACTION UNIT
57 SELECTION UNIT
58 MAXIMUM VALUE SELECTION UNIT
59 TARGET ROTATION SPEED CALCULATION UNIT

The invention claimed is:

1. An engine control device of a work machine, the control device controlling an internal-combustion engine of the work machine including a swing body, an implement attached to the swing body, a hydraulic actuator that operates the implement, a hydraulic pump that operates the hydraulic actuator, and the internal-combustion engine that drives the hydraulic pump and of which a rotation speed is changed according to a load, comprising:

a determination unit configured to determine whether a condition not requiring work with the implement is established; and an engine control unit configured to enable control at relief time of determining a target rotation speed targeted by the internal-combustion engine based on horsepower sucked by the hydraulic pump of when a hydraulic oil ejected by the hydraulic pump is relieved when the condition is established, and disable the control at relief time when the condition is not established, wherein the control at relief time is a scenario in which, to suppress an increase in the rotation speed during implementation of a relief operation of the hydraulic oil, the target rotation speed is fixed to the rotation speed targeted by the internal-combustion engine when a generator motor generates a maximum generation power at the time of relief of the hydraulic oil.

2. The engine control device of a work machine according to claim 1, wherein the condition is either one of a time of diagnosis that is a case of diagnosing at least the work machine and a time of swing lock that is a case of fixing swing of the swing body included in the work machine.

3. The engine control device of a work machine according to claim 1, wherein the hydraulic actuator is a hydraulic cylinder.

4. The engine control device of a work machine according to claim 1, wherein the work machine includes
 a generator motor driven by the internal-combustion engine, and
 a storage device that stores electric power generated by the generator motor, and supplies the stored electric power to the generator motor.

5. A work machine comprising the engine control device of a work machine according to claim 1.

6. An engine control method of a work machine, in controlling an internal-combustion engine of the work machine including a swing body, an implement attached to the swing body, a hydraulic actuator that operates the implement, a hydraulic pump that operates the hydraulic actuator, and the internal-combustion engine that drives the hydraulic pump and of which a rotation speed is changed according to a load, the method comprising:
 determining whether a condition not requiring work with the implement is established; and
 enabling control at relief time of determining a target rotation speed targeted by the internal-combustion engine based on horsepower sucked by the hydraulic pump of when a hydraulic oil ejected by the hydraulic pump is relieved when the condition is established, and disabling the control at relief time when the condition is not established, wherein the control at relief time is a scenario in which, to suppress an increase in the rotation speed during implementation of a relief operation of the hydraulic oil, the target rotation speed is fixed to the rotation speed targeted by the internal-combustion engine when a generator motor generates a maximum generation power at the time of relief of the hydraulic oil.

* * * * *